United States Patent [19]

Denzer

[11] Patent Number: 5,307,413
[45] Date of Patent: Apr. 26, 1994

[54] METHOD AND APPARATUS FOR ADDING DATA COMPRESSION AND OTHER SERVICES IN A COMPUTER NETWORK

[75] Inventor: Philip C. Denzer, Wellesley, Mass.

[73] Assignee: Process Software Corporation, Framingham, Mass.

[21] Appl. No.: 733,104

[22] Filed: Jul. 19, 1991

[51] Int. Cl.[5] .......................... H04B 1/66; H04L 9/00
[52] U.S. Cl. ......................................... 380/49; 380/9; 370/109; 375/122
[58] Field of Search ............... 380/4, 9, 25, 49, 50; 395/21, 24, 25; 364/240.8, 242.94–242.96, 274.9, 276.6, 940.61–940.62, 940.81, 972.4; 375/122; 340/825.8, 825.5; 381/34, 35; 370/109

[56] References Cited

U.S. PATENT DOCUMENTS

| | | | |
|---|---|---|---|
| 4,533,948 | 8/1985 | McNamara et al. | 340/825.5 X |
| 4,691,314 | 9/1987 | Bergins et al. | 370/94 |
| 4,748,638 | 5/1988 | Friedman et al. | 375/8 |
| 4,833,468 | 5/1989 | Larson et al. | 340/825.8 |
| 4,972,473 | 11/1990 | Ejiri et al. | 380/9 X |

OTHER PUBLICATIONS

Strass, Hermann, "D-A-T-A Compression," *DEC Professional*, Feb. 1991, pp. 58–62.
Turner, Steven E., "Small Is Beautiful: How V.42bis Cuts Costs," *Data Communications*, Dec. 1990, pp. 101–104.
Welch, Terry A., "A Technique for High-Performance Data Compression," *Computer* Magazine, vol. 17 No. 6 (Jun. 1984), pp. 8–19.
"Sotfware Product Description FCX Version 3.2," brochure of Innovative Computer Systems, Inc., (ICS), 1930 E. Marlton Pike, Cherry Hill, N.J. 08003, pp. 1–4, no date.
"FCX-pcFCX-File Compression for VAX/VMX and MS-DOS Systems," brochure of Innovative Computer Systems, Inc. (ICS, Inc.), 1930 E. Marlton Pike, Cherry Hill, N.J. 08003, (4 pages), no date.
F. Jay, *IEEE Standard Dictionary of Electrical and Electronics Terms*, (ANSI/IEEE Std. 100-1984); (IEEE, New York, 1984, p. 695, "Protocol").

*Primary Examiner*—Bernarr E. Gregory
*Attorney, Agent, or Firm*—Weingarten, Schurgin, Gagnebin & Hayes

[57] ABSTRACT

A connection specific compression system is selectively implemented in connections having the greatest data redundancy and utilizes modularity in implementing data compression in a layered network communication system. A data compression facility is interfaced in the layered system and intercepts data at a protocol layer prior to the data being packetized for transmission. A system acting as a compression host comprises a data packet switch driver which intercepts application data packets passing over layered network interfaces and routes selected client application data packets to an associated local compression process which has an integral network protocol and which compresses the data stream in accordance with a selected compression algorithm. The compressed data passes through the system network protocol and the packet switch driver subsequently sends the compressed data back into the communications stream through a network driver. The compressed data passes across the network communication channel and is received by a decompression host having peer compression/decompression capabilities. The peer compression process decompresses the received data and sends it, via a second/decompression host resident packet switch driver, as though received from the network, into the decompression host system network protocol for connection with an application running on the second host.

19 Claims, 9 Drawing Sheets

TCP PACKET

IP PACKET

LLC PROTOCOL DATA UNIT (LLCPDU)

MEDIA ACCESS CONTROL FRAME (MAC FRAME)

TCP/IP PACKETIZATION

METHOD AND APPARATUS FOR ADDING DATA COMPRESSION AND OTHER SERVICES IN A COMPUTER NETWORK

FIELD OF THE INVENTION

The present invention relates to data compression and in particular to data compression in the context of networked computers.

BACKGROUND OF THE INVENTION

Systems are known which provide for connectivity in and among networks of computerized equipment. Such systems, ideally, must accommodate a proliferation of different network interfaces and hardware, as no single "standard" is adopted universally.

In order to permit computer systems to communicate, regardless of connection method or vendor-specific hardware implementation, or to permit different networks to communicate or be "internetworked", modularized/layered solutions have been proposed for the problems associated with interconnectivity. Layering divides the task of interconnection and communication into pieces (layers), wherein each layer solves a piece of the problem or provides a particular function and is interfaced to adjacent layers. Each of the layers is responsible for providing a service to ensure that the communication is properly effected. Examples of some services provided by the various layers are error detection, error recovery and routing among many communication paths. All the layers in conjunction present the overall communication solution. Experience has shown that modularizing in layers with well defined functional interfaces, divides and effectively reduces the complexity of the connectivity problem and leads to a more flexible and extensible solution.

A model for describing the layers in a network has been posited by the International Standards Organization (ISO). The ISO open systems interconnection (OSI) model is a seven-layer model, illustrated in FIG. 1, which provides a standard for describing a network and facilitating computer communications. OSI and other layered computer network communications standards are discussed in detail in *Unix Network Programming* by W. Richard Stevens, and *Handbook of Computer-Communication Standards* by William Stallings, which are incorporated herein by reference. The OSI model defines the layers and units of information that pass along a network. As illustrated, data from an application or process running on a first host (HOST A) moves down the model network layers to a Physical layer. The Physical layer defines the physical connection which transmits raw bits across a communication channel to another host (HOST B) and up corresponding layers to a process running thereon. OSI, while defining a model or framework in which standards and protocols can be developed at each layer, allows for a flexible approach for implementation of the model.

Layered protocols and interfaces therebetween have been defined, which provide specifications for communication between a process or program being executed on one computer's operating system and another process running on another computer. Transmission Control Protocol/Internet Protocol (TCP/IP) are two protocols that are part of a protocol suite or family of protocols layered and designed to connect computer systems that use different operating systems and network technologies. TCP/IP, which provides a common set of protocols for invocation on dissimilar interconnected systems, is illustrated and mapped in FIG. 1a to analogous layers of the OSI model.

TCP/IP is a four layer protocol suite which facilitates the interconnection of two or more computer systems on the same or different networks and in certain networks, such as the Internet, is a requirement for interoperability. The four layers, comprise two independent protocols: TCP which can be used to access applications on other systems within a single network; and IP which permits identification of source and destination addresses for communication between systems on different networks.

As illustrated in FIG. 2, application or process data communicated via TCP/IP is "packetized" as it passes down layers through the protocol suite. The original process data first has an information block called a TCP Header prefatorily appended thereto in a TCP layer, to form a TCP packet. The TCP Header contains information to assure that the data travels from point to point reliably without picking up errors or getting lost. An IP layer repacketizes the TCP packet into an IP packet, by adding an IP Header which contains information needed to get the packet to a destination node. The IP packet is further packetized, such as in ANSI/IEEE 802 local area network protocol, with an additional Logical Link Control (LLC) address header and a control header at an LLC layer, to form an LLC Protocol Data Unit (LLCPDU). The LLCPDU is "framed" for transmission by addition of a Media Access Control Header and Trailer, to form a MAC Frame for communication between two TCP/IP facilities.

It is apparent that a considerable amount of "baggage", in the form of headers and trailer, is added to data which is transmitted between facilities using a layered protocol suite, such as TCP/IP and other OSI modelled families. Many additional bits are added at the various layers and must be processed for ultimate transmission across a communication channel at the physical layer. At its destination, the transmitted frame must be unpacketized according to embedded instructions and passed upward through the layered protocols to its receiving application or process.

Aside from the significant processing overhead associated with packetizing data for network and internetwork transmission, data itself may be redundant, such that real costs are associated with putting data and all its protocol suite baggage across the communication channel.

Where the communication channel is integral to a wide area network (WAN) the impact of redundant data and protocol suite baggage on transmission costs can be measured in dollars. WAN links, such as dial-up phone lines, typically have relatively low, fixed upper limit data transmission rates and are billed based on connect time, packet count or bandwidth use. Thus, the extensive packetization and resultant bits that must be transmitted increase connect time and dollar cost. Additionally, the numerous appended bits significantly increase the possibility of transmission errors on less reliable lines. Where WAN links, such as analog leased lines, and Dataphone Digital Services (DDS) are used, monthly or annual subscription fees recur and to a great extent are consumed by traffic comprising the transmission of redundant bits and protocol attributable header and trailer information.

Compression schemes and apparatus are known which reduce the quantity of bits that must be transmitted across the communication channel. However, data compressing modems, such as disclosed in U.S. Pat. No. 4,748,639, compress data streams after packetization for transmission over the communication channel. Significant additional hardware is required, in the form of a compression modem and a decompression modem. The additional hardware, which translates into significantly increased system cost, requires frequency tables to recodify and decodify or decompress characters in a data stream in accordance with a compressed character code. Such a compression scheme is not host resident, does not take advantage of the modular/layered structure of the network communication system and lacks the flexibility to reduce the number of packets and headers generated in the transmission of a particular data stream. Further, because compression modems service multiple connections and data that may come from one or more systems, redundancy of data tends to be random. It is appreciated that randomly redundant data is more difficult to compress.

Network bridge products are available that also have data compression facilities. However, much like compression modems, bridges do not provide host resident end-to-end compression facilities. Bridges also do not have the capability to reduce packet count. Like compression modems, bridge products are not connection specific and must process data from various connections which tend to provide data that is randomly redundant. Thus data compression with bridge products may not achieve optimal compression ratios.

Host resident compression is available with application programs that incorporate compression algorithms. However, such programs typically retrieve a file from a mass storage device such as disk storage, process the file and return it to the disk. The processed file must then be retrieved from the disk to be shipped through the network layers for transmission. In addition to the significant additional overhead required for the disk storage and retrieval, such compression applications require that process data be effectively compiled as a compressed data file and recompiled or decompressed at a destination facility. Such compression and decompression significantly delays the availability of data subjected to this process of data transmission. Such decompression programs, although host resident, are typically not integrated with particular applications and must be invoked so that they are not transparent to the user.

SUMMARY OF THE INVENTION

The present invention is a connection specific compression system which is selectively implemented in connections having the greatest data redundancy and takes advantage of modularity in implementing data compression in a layered network communication system. A data compression facility is interfaced in the layered system and intercepts data at a protocol layer prior to the data being packetized for transmission. Therefore, fewer packets need to be created and fewer headers and trailers need to be generated to transmit the compressed data.

According to the invention, a system acting as a compression host comprises a data packet switch driver which intercepts application data packets passing through layered network interfaces, prior to further packetization. When the system is acting as a compression host and transmitting data to an application on a second/decompression host, the data packet switch driver establishes a connection between a client application on the compression host and a system network protocol kernel interface (commonly called a socket) and routes selected client application data packets to an associated local compression process which has an integral network protocol. The data packets selected for compression are delivered to the compression process which opens a second connection to the system network protocol interface and compresses the data stream in accordance with a selected compression algorithm. The compressed data passes through the system network protocol and the packet switch driver subsequently sends the compressed data back into the communications stream through a network driver. The compressed data passes across the network communication channel and is received by the decompression host having compression/decompression capabilities according to the invention.

The decompression host receives the compressed data through its network interface and delivers it to a peer compression process having its own complimentary integral network protocol. The peer compression process decompresses the received data and sends it, via a second/decompression host resident packet switch driver, as though received from the network, into the decompression host system network protocol for connection with an application running on the second host.

In another embodiment, a host system having data compression according to the invention is used as a gateway to process transmissions of systems not having compression according to the invention, which are destined for another host having compression according to the invention.

Features of the invention include end-to-end enhanced data transmission having data compression that is transparent to the user effected between at least two hosts. Reduction in data and number of packets transmitted across the communication channel improves Wide Area Network performance and response time while traffic is reduced to effectively increase WAN bandwidth. Compression according to the invention can be used with various network interfaces supported by the host because it operates independently of the network physical layer. Bridges and routers on the network will not affect, or be affected by, transmission of data serviced according to the invention.

A compression management facility permits system manager invocation and definition of a configuration file of paths or connections in the network, which are to be compressed. Parameters can be set and displayed relating to data to be selected for compression. Statistics can be compiled and logged, to track: number of packets sent and received; number of connections serviced; number of connections open; compression ratio; and compression paths and interfaces in use.

DESCRIPTION OF THE DRAWING

The invention will be more fully understood from the following detailed description taken in conjunction with the accompanying drawing in which:

FIG. 2 is a diagrammatic view of data packetized in accordance with the TCP/IP model of FIG. 1a;

FIG. 5 is a flow chart of functions of a packet switch driver of FIG. 4a;

FIG. 6 is a block diagram of a compression process of FIG. 4a; and

DETAILED DESCRIPTION

Figure 1:
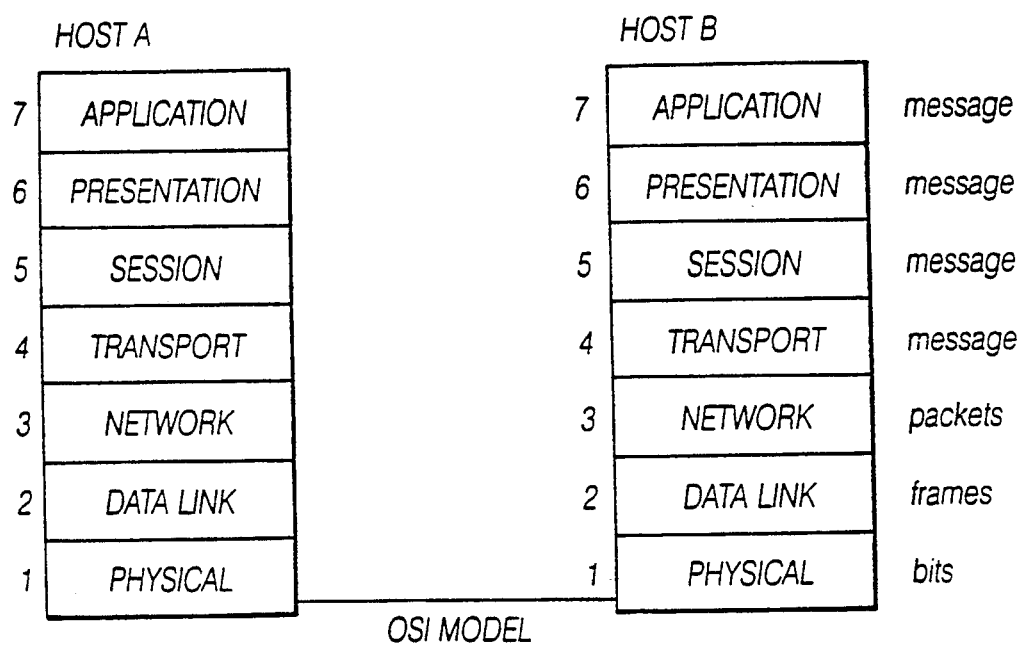
FIG. 1 is a diagrammatic view of an Open Systems Interconnection (OSI) model according to the prior art.
Figure 1A:
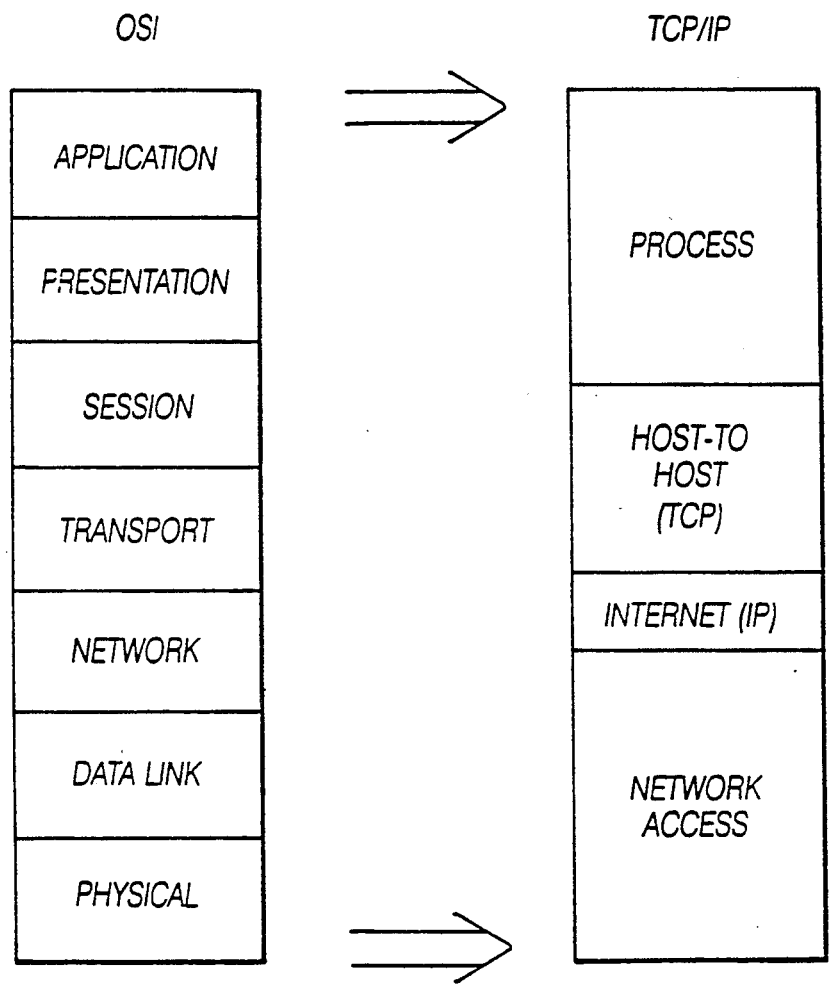
FIG. 1a is a diagrammatic view of the OSI model of FIG. 1 compared to a Transmission Control Protocol/Internet Protocol (TCP/IP) model according to the prior art.
Figure 2:
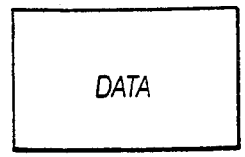
Figure 2:
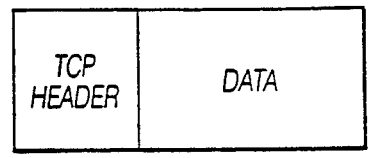
Figure 2:
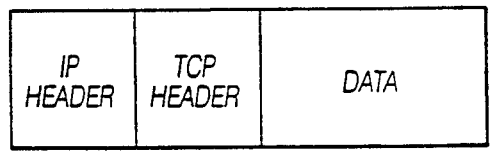
Figure 2:
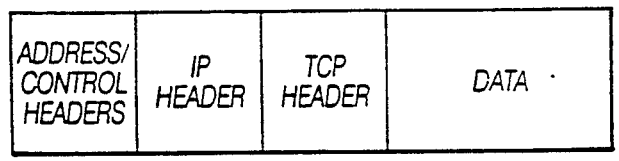
Figure 2:
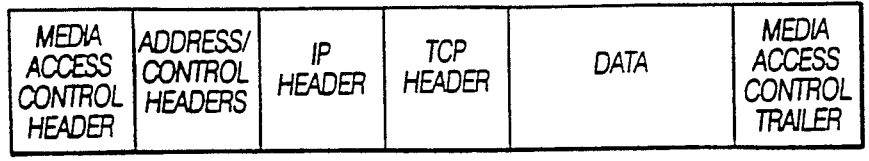
Figure 3:
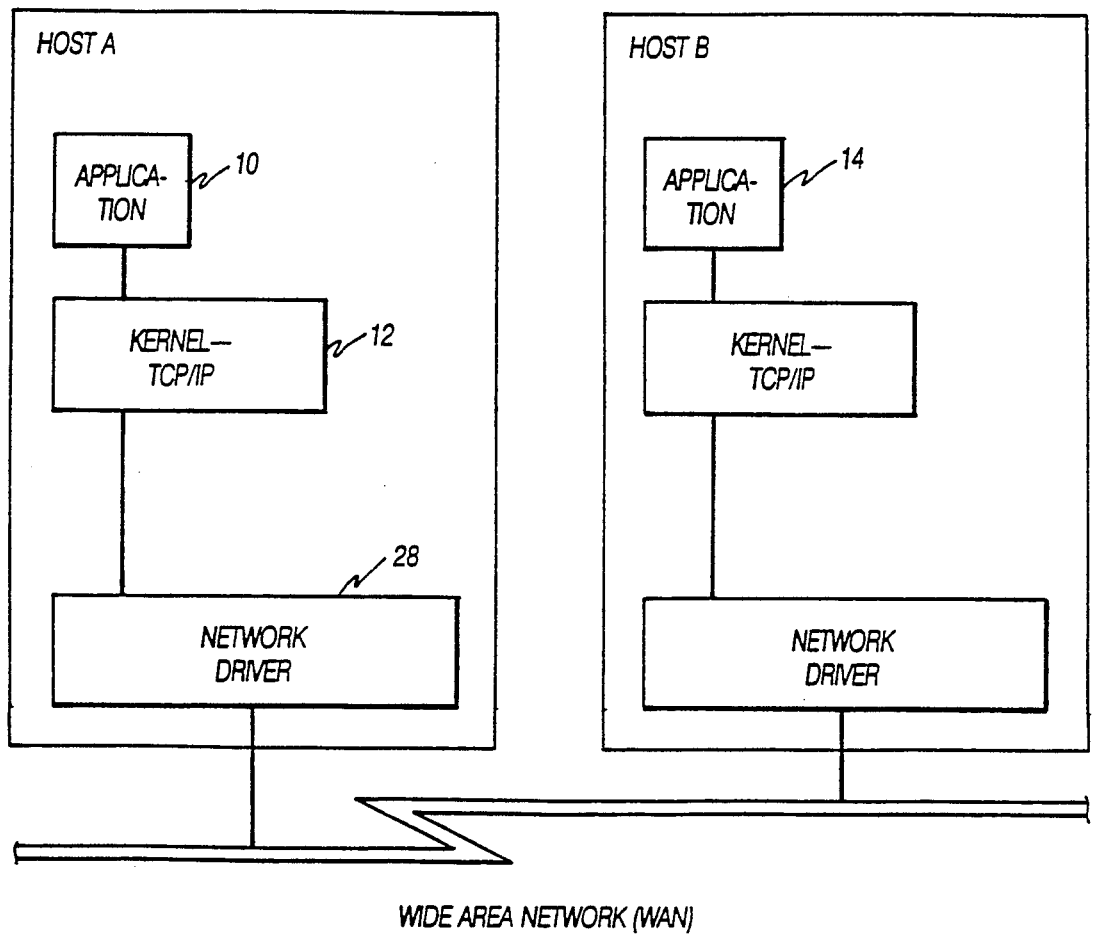
FIG. 3 is a block diagram of an illustrative TCP/IP connection from a first host to a second host across a Wide Area Network, according to the prior art, without data compression.

A host-to-host interconnection of two computers having TCP/IP network capabilities for communicating across a Wide Area Network, as illustrated in FIG. 3, provides a suitable environment for discussion of the present invention. Without compression, such an interconnection comprises an application 10 running under an operating system on a first system, Host A, which transfers data to a socket or interface of a TCP/IP protocol stack 12 comprising two layers, TCP and IP, of the four layers of a TCP/IP protocol suite for packetizing the data for transmission, as discussed hereinbefore. Fully TCP/IP packetized "datagrams" are delivered to a network interface driver, which effects further packetization, framing and transmission of the data on the WAN medium. A network interface driver at the receiving host, Host B, strips and passes the datagrams, including the data, to a Host B TCP/IP kernel where the data is de-packetized and a connection is accepted and made to an application or process running thereon which reads the data.

Figure 4:
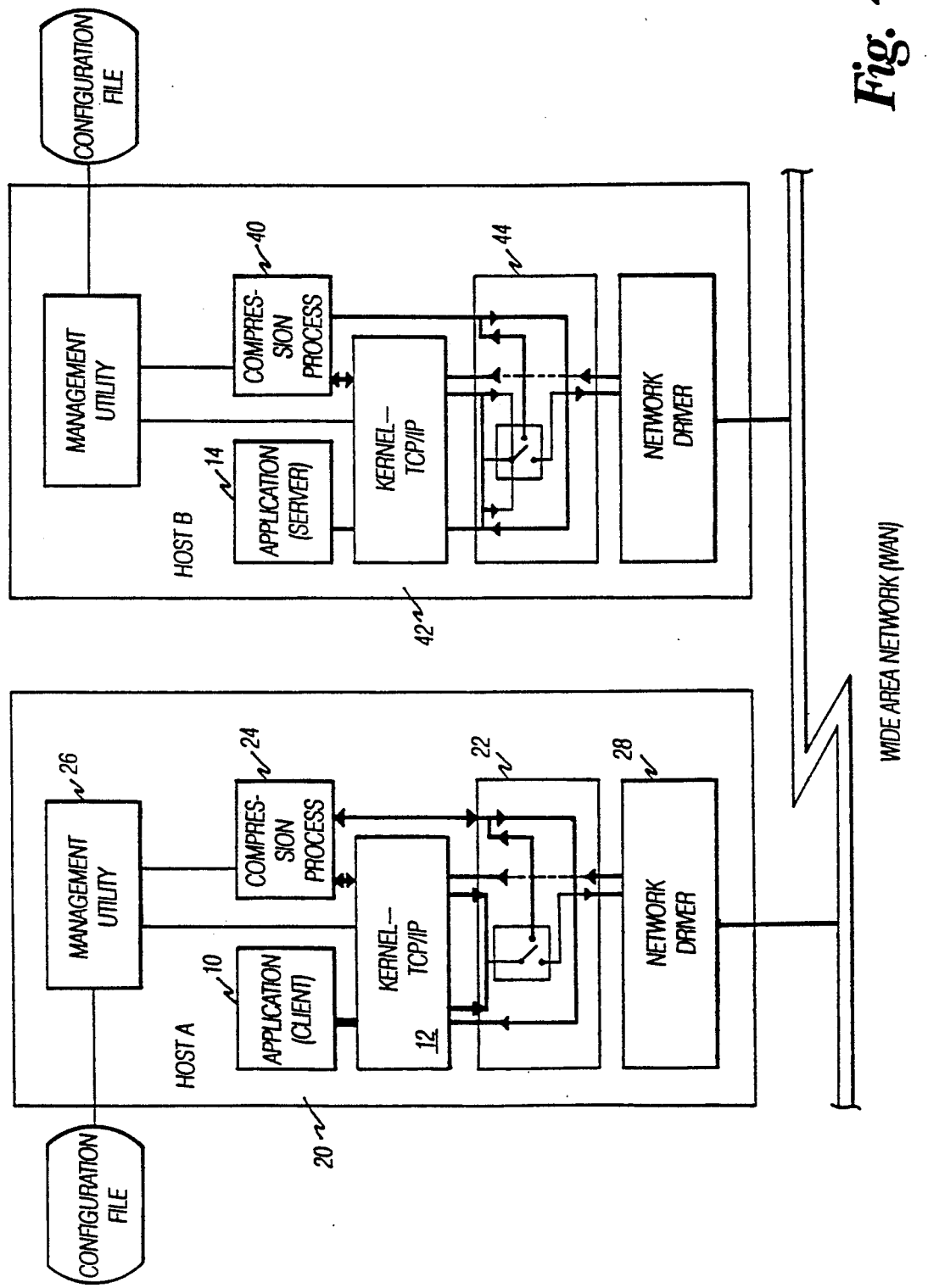
FIG. 4 is a block diagram of a two host end-to-end connection having compression according to the invention in a TCP/IP implementation.

Referring now to FIG. 4, a system 20 having TCP/IP capabilities and data compression according to the invention comprises a first host, Host A, having a packet switch driver 22 installed between the host TCP/IP kernel 12 which receives data from the application or process 10, and a network interface driver 28 that effects a lower layer of packetization, framing and transmission of the data on the WAN. The packet switch driver 22 communicates with a local compression process 24, which is itself in communication with the host TCP/IP kernel 12 and functions as described hereinafter. A management utility 26 oversees and facilitates configuration of compression within the system 20, according to the invention.

Figure 4A:
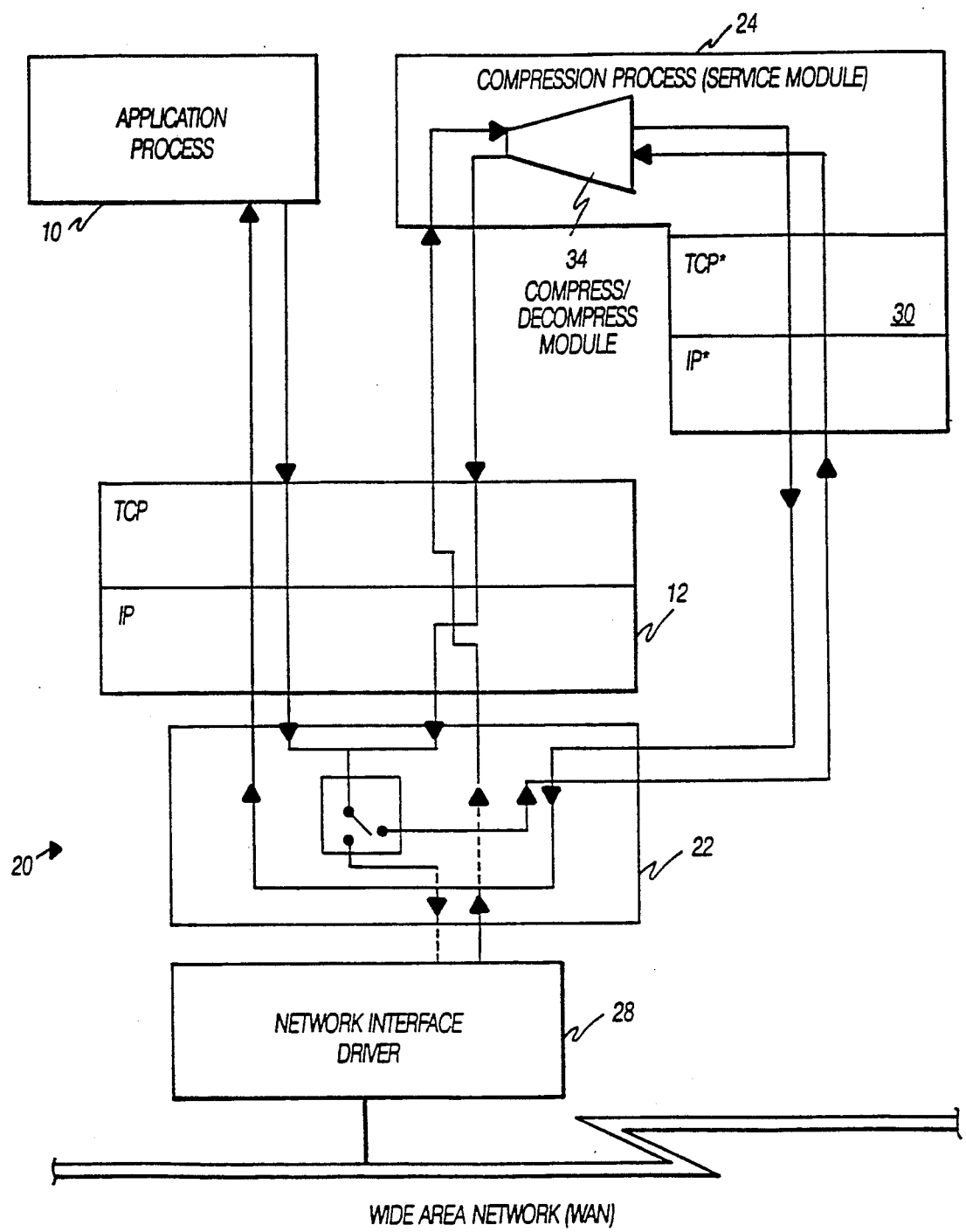
FIG. 4a is a block diagram of a host having compression according to the invention in a TCP/IP implementation.
Figure 5:
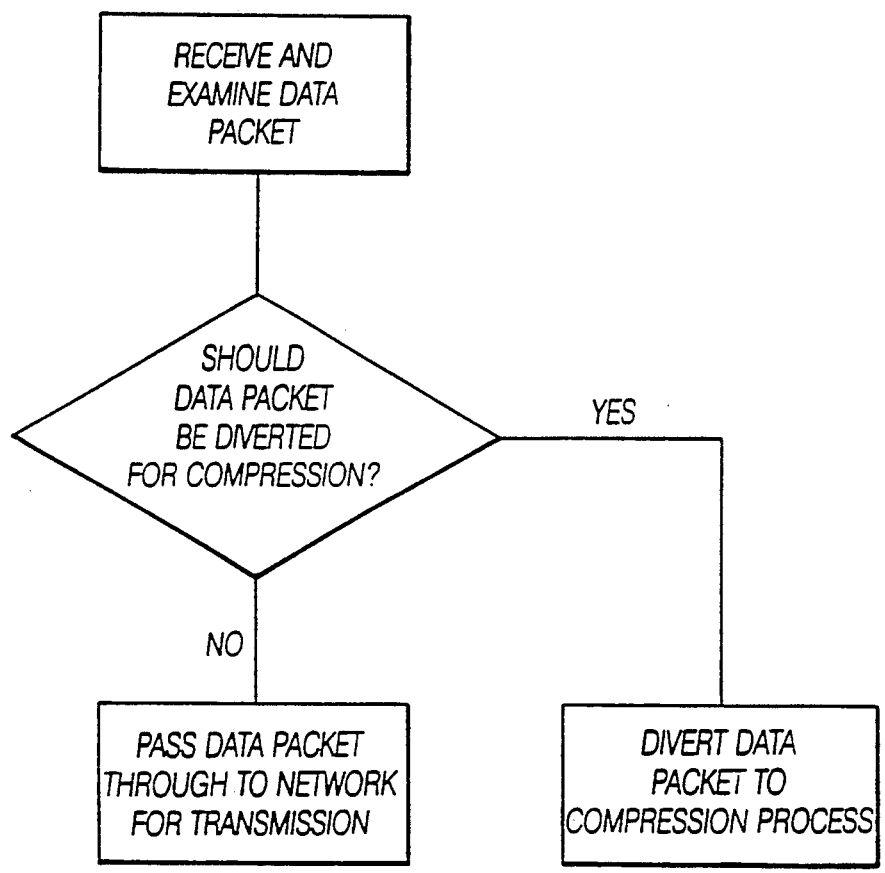

When the application 10, such as one running on Host A, seeks to communicate with a remote application 14, such as one running on Host B, a request and data are passed to the host TCP/IP layers 12 running in an operating system kernel. The packet switch driver 22, as illustrated in FIGS. 4, 4a and 5, receives all data travelling to the network interfaces from an application. The packet switch driver 22 examines all such data and intercepts selected data for routing to the local compression process 24, according to predetermined criteria.

Data is selected for compression based upon operating parameters, such as network interface addresses and paths, established via the management utility 26 and maintained by the compression process 24 discussed hereinafter. The packet switch driver 22 compares the data packet address appended in the TCP/IP layers and determines if the data packet should be routed for compression. If the packet switch driver 22 determines that the data packet should not be compressed, that data packet is passed through to the network driver 28 to continue untouched in the communication stream. The selected data packets, in accordance with addresses listed in a configuration file established via the management utility 26, are switched to the local compression process 24.

Figure 6:
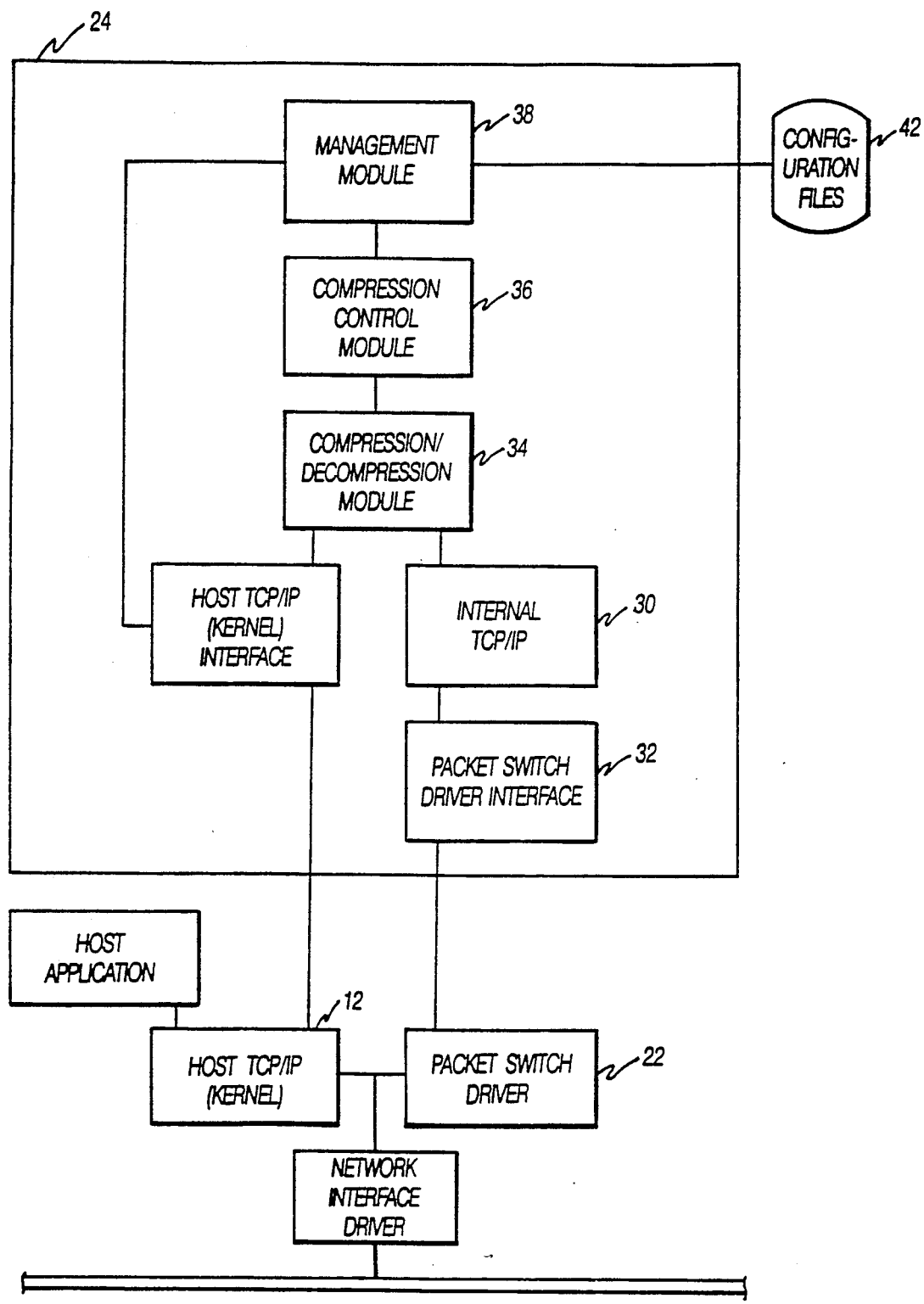

Packets intercepted by the packet switch driver 22 for compression are passed through a compression process-packet switch driver interface 32 (FIG. 6) and received by internal TCP/IP layers 30 that are functionally interrelated with the compression process 24, and not part of the host TCP/IP 12 running under the operating system. The compression process 24, illustrated in FIGS. 4a and 6, functioning with the internal TCP/IP layers 30, performs TCP/IP input processing which assures the reliability of the data stream in the packets received from the packet switch driver 22.

A compression/decompression module 34 represents a service module which is modularly integrated with the internal TCP/IP layers 30 and communicates with the host TCP/IP 12 for transmitting data on the network. The compression/decompression module/34 comprises a general purpose compression/decompression algorithm, which is interfaced to permit different compression methods to be easily integrated. A compression/decompression module 34, in one example, is an implementation of a Lempel-Ziv algorithm for sequential data compression, which is deselectable or modularly removable to permit selection of an alternative algorithm known in the art, such as an LZW compression implementation or Huffman encoding. Data received by the compression process from the packet switch driver 22 is compressed for transmission by the compression/decompression module 34 in accordance with the selected algorithm.

A compression control module 36 in the compression process 24, in conjunction with a management module 38 that is a compression process resident portion of the management utility 26, effect two phases in communication of compressed data from the compression process 24 to a remote compression process 40 (FIG. 4), within remote Host B.

A first phase in communication of compressed data between compression processes involves the negotiation of connections. If it is determined by the switch 22 that a request to connect to a remote application requires invocation of data compression, the local compression process 24 that receives the diverted data determines if a connection needs to be made to the remote compression process 40 at the specified destination internet address. A connection table (not shown) within the local compression process maintains the status of TCP/IP connections made or being attempted between local and remote internet address/port pairs. The local compression process 24 attempts to connect to the remote compression process 40 internet address specified in the local application's connection request. If the local compression process 24 does not have sufficient resources or resources available, such as free memory, an unused connection and/or does not support the selected algorithm, the attempt is aborted and the connection table modified accordingly. If a connection attempt fails, perhaps because the remote host is down or otherwise not available for connection, the local compression process maintains a decision table (like the decision table which the packet switch driver uses in determining if a given application's data should be diverted for compression), which is updated to indicate that connection packets destined for that internet address should not be diverted for compression. A timeout scheme and retry mechanism may be implemented so that the remote internet address may be tried at a later time, or the compression process may choose to route uncompressed data over a normal connection.

A second phase in communication of compressed data is the actual data transfer between the local and remote compression processes can proceed if the TCP/IP connection is effected. The local compression process 24 will send a buffer of data to the remote compression process 40 through the host TCP/IP. The data will contain application to application connection and addressing information, information relating to services to be provided by the local and remote compression processes and information concerning the selected compression algorithm and its use. The remote compression process receiving the data examines the various fields of information to determine if there is resident support for the facilities requested. If the remote compression process can not support the data, the connection will be aborted and the data will be returned to the local compression process with a response header indicative of the remote process facilities and the status of the connection.

The remote compression process, determining that there is support for the data transmission, tries to establish a connection to the remote application indicated by the destination address in the header. The remote compression process establishes the connection to the destination application, through the remote host packet switch driver 44, and the remote host TCP/IP 42. This is done in such a way that the address/port may be modified to present the appearance that the local application 10 was connected directly to the destination application in the remote Host B, without the intervening compression processes. This avoids the invalidation of the transmission by applications which selectively verify incoming port numbers for validity.

When the connection to the destination application is established, the remote compression process returns a response data buffer to the local compression process 40, which will indicate that the selected compression algorithm was accepted, and the status of the connection. When the local compression process 24 gets the response data buffer back from the remote compression process 40, it effects updating of the compression process connection and decision tables and the packet switch driver connection and decision tables. The information regarding address and selected compression algorithm are stored, preferably in the connection table, for use on the affected connection. The connection is completed locally, in the remote Host B. Host A starts compressing and transmitting data, while in Host B, the remote compression process decompresses transmitted data into the original data stream, performs TCP/IP processing in its internal TCP/IP to rebuild the data into packets and writes the data to the packet switch driver 44. The packet switch driver 44 injects the data, decompressed in accordance with the selected compression/decompression algorithm, back into the communication stream of the destination application.

If the connection between the remote compression process and the destination application fails, a response buffer is returned that is indicative of the error. When the local compression process gets the data buffer back with the indicated failure, it will effect closure of the TCP/IP connection and update the connection and decision tables accordingly, so that the connection proceeds normally.

The management utility 26 facilitates management and control of the configuration of compression paths. A system manager can define a configuration file 42, which is accessible to the management module 38 of a compression process to specify which data is selected for compression. Data is selectable by specifying particular network interfaces from which the packet switch driver will intercept packets for diverting to the compression process for compression. Compression paths can be specified, in a TCP/IP application of the invention, in accordance with the TCP/IP addressing scheme consisting of a destination internet address, destination port, source internet address and source port. Uni-directional or bi-directional compression can be specified. The configuration file is read upon initialization of the hereinbefore defined compression implementation.

Figure 7:
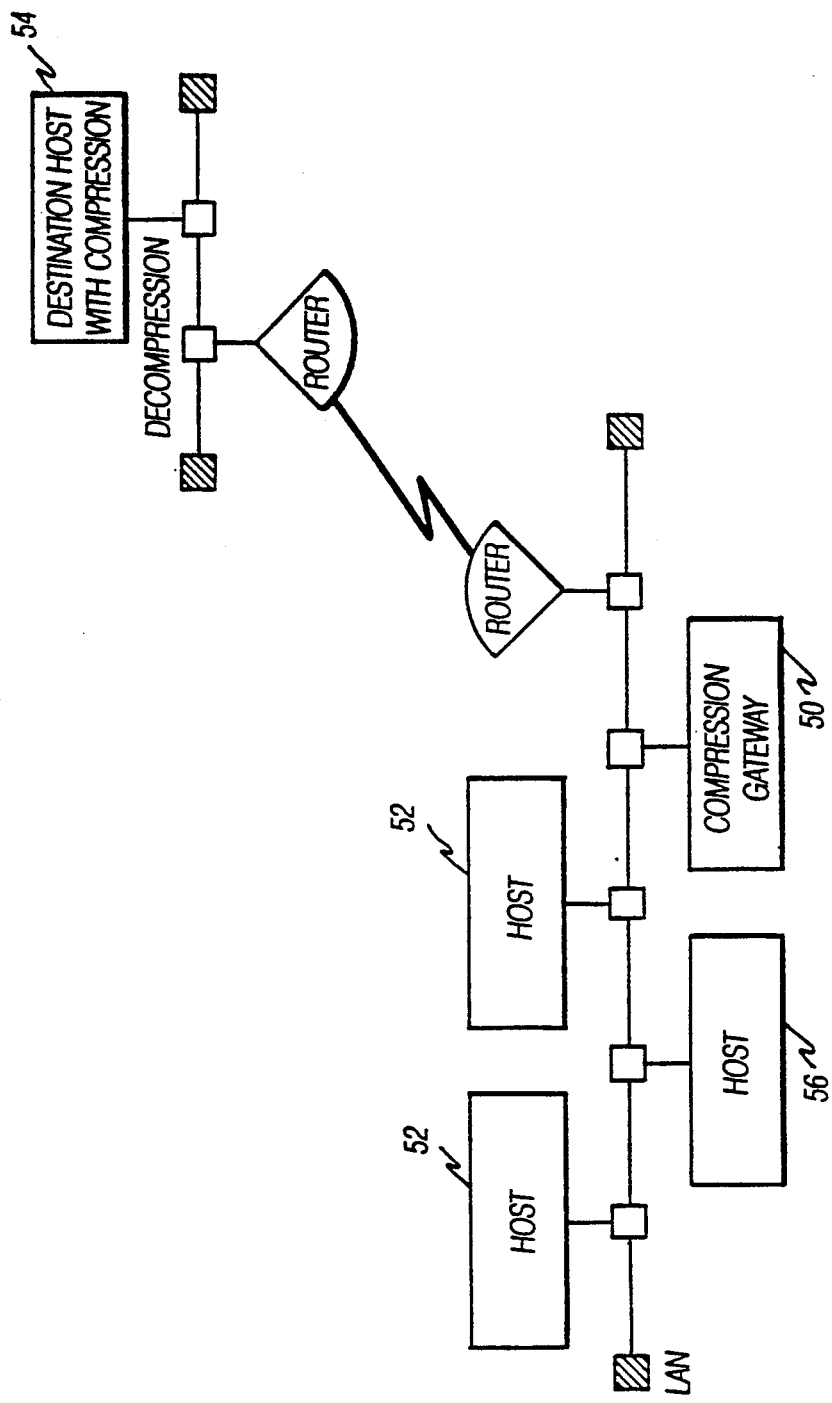
FIG. 7 is a block diagram of a system having compression according to the invention implemented as a gateway.

Referring now to FIG. 7, the compression implementation according to the invention can be effected as a gateway implementation in a local area network having a plurality of processors, or gateway clients, that do not have such a compression implementation installed thereon. One host 50 having compression according to the invention implemented thereon acts as a gateway for a plurality of gateway clients 52 on the network to facilitate communication with a remote host 54 having such a compression facility. The gateway clients 52 must be known to the compression host 50, such as by establishing an indicative field in the configuration file, so that the gateway clients 52 can be serviced while other systems 56 on the network are precluded from similar services as described hereinbefore.

The compression/decompression module 34 modularly integrated in the compression process 24 (FIG. 6) can be replaced or supplemented with additional modular facilities to provide other services in the communication stream between layers of a given protocol stack. Services such as encryption/decryption could be made available to networked and internetworked computing machinery, according to the invention.

Although the invention as disclosed hereinbefore describes data compression in the context of networks according to TCP/IP, it can be appreciated that data compression can be implemented according to the invention between analogous layers in protocol suites other than TCP/IP, such as DECNET and OSI standard protocol suites and the like.

While data compression according to the invention is described in the context of compression for transmission on a wide area network, it will be appreciated that compression according to the invention is applicable in the context of local area networks. Especially with the trend in increased processor speeds which may result in compression processing speeds in excess of LAN transmission speeds.

Although selection of data for compression is effected hereinbefore in accordance with an address in the header, other data fields can be established and other criteria used for selection of data for provision of services as described.

One of ordinary skill in the art will appreciate that the invention described hereinbefore can be implemented in software, hardware or a combination thereof.

Although the invention has been shown and described with respect to an exemplary embodiment thereof, various other changes, omissions and additions in the form and detail thereof may be made therein without departing from the spirit and scope of the invention.

What is claimed is:

1. An apparatus for integrating services between protocol layers in a computer system having layered network protocols, comprising:
   a first network layer having a first interface, and a second interface and operating according to a first protocol, and a second network layer having a first interface, and a second interface and operating according to a second protocol;
   a switch driver responsive to said second interface of said first layer that receives a plurality of signal groups therefrom, said switch driver being configurable for routing at least some of said plurality of signal groups through at least one of a first path and a second path to said first interface of said second layer; and
   at least one service module responsive to said switch driver for receiving at least some of said plurality of signal groups through said first path and that performs an operation on said at least some of said plurality of signal groups from said first path to form a plurality of modified signal groups,
   wherein said at least one service module transmits said plurality of modified signal groups to said first interface of said first layer and said switch driver receives said plurality of modified signal groups.

2. The apparatus of claim 1 wherein said switch driver is selectively configurable in accordance with at least one set of predetermined criteria.

3. The apparatus of claim 2 wherein said at least one set of predetermined criteria is tested by comparing selected signals with a portion of signals of each of said plurality of signal groups.

4. The apparatus of claim 1 wherein said at least one service module comprises a compression processor and said operation performed on said at least some of said plurality of signal groups is data compression.

5. The apparatus of claim 1 wherein said at least one service module comprises a decompression processor and said operation performed on said at least some of said plurality of signal groups is data decompression.

6. The apparatus of claim 1 wherein said at least one service module operates according to a protocol compatible with said first protocol of said first layer.

7. The apparatus of claim 1 wherein said switch driver receives said plurality of modified signal groups for routing to said first interface of said second layer.

8. The apparatus of claim 1 wherein said at least one service module comprises an encryption processor and said operation performed on said at least some of said plurality of signal groups is data encryption.

9. The apparatus of claim 1 wherein said at least one service module comprises a decryption processor and said operation performed on said at least some of said plurality of signal groups is data decryption.

10. The apparatus of claim 1 wherein said protocol of said first layer requires disassembly of a data stream and assembly of said at least some of said plurality of signal groups therefrom and said at least one service module receives said at least some of said plurality of signal groups and reassembles said data stream.

11. The apparatus of claim 1 wherein said switch driver includes at least one set of predetermined criteria for determining said at least some of said plurality of signal groups for routing to said at least one service module.

12. The apparatus of claim 1 wherein said at least one service module includes at least one set of predetermined criteria for determining said at least some of said plurality of signal groups for routing to said at least one service module.

13. The apparatus of claim 1 wherein selected signals are stored in an accessible and modifiable configuration file.

14. The apparatus of claim 1 further comprising a path to pass a second plurality of signal groups from said first interface of said second layer to said second interface of said first layer and from said first interface of said first layer to said service module.

15. A method for providing a service between protocol layers in a computer system having layered network protocols, said method comprising the steps of:
   intercepting a first plurality of signal groups travelling along a layered network protocol stack at a first layer interface;
   comparing a portion of each of said first plurality of signal groups with a predetermined set of signal groups to determine selected signal groups for performing an operation thereon to provide said service;
   routing said selected signal groups to a service module;
   performing said operation on said selected signal groups to provide said service; and
   routing said selected signal groups to a second layer interface.

16. The method of claim 15 wherein said operation is data compression.

17. The method of claim 15 wherein said operation is data decompression.

18. The method of claim 15 wherein said operation is data encryption.

19. The method of claim 15 wherein said operation is data decryption.

* * * * *

UNITED STATES PATENT AND TRADEMARK OFFICE
CERTIFICATE OF CORRECTION

PATENT NO. : 5,307,413
DATED : April 26, 1994
INVENTOR(S) : Philip C. Denzer

It is certified that error appears in the above-indentified patent and that said Letters Patent is hereby corrected as shown below:

Column 3, line 5, "streams after" should read --streams *after*--.

Column 7, line 16, "processes can" should read --processes, which can--.

Signed and Sealed this

Third Day of January, 1995

Attest:

BRUCE LEHMAN

Attesting Officer         Commissioner of Patents and Trademarks